United States Patent
Domingo et al.

(10) Patent No.: US 9,636,950 B2
(45) Date of Patent: May 2, 2017

(54) TIRE COMPRISING A LAYER OF CIRCUMFERENTIAL REINFORCING ELEMENTS

(71) Applicants: Compagnie Generale Des Etablissements Michelin, Clermont-Ferrand (FR); Michelin Recherche Et Technique S.A., Granges-Paccot (CH)

(72) Inventors: Alain Domingo, Clermont-Ferrand (FR); Jacques Besson, Clermont-Ferrand (FR); Francois Barbarin, Clermont-Ferrand (FR); Gilles Sallaz, Clermont-Ferrand (FR); Robert Ciprian Radulescu, Clermont-Ferrand (FR)

(73) Assignees: COMPAGNIE GENERALE DES ETABLISSEMENTS MICHELIN (FR); MICHELIN RECHERCHE ET TECHNIQUE S.A. (CH)

( * ) Notice: Subject to any disclaimer, the term of this patent is extended or adjusted under 35 U.S.C. 154(b) by 281 days.

(21) Appl. No.: 14/351,005

(22) PCT Filed: Oct. 12, 2012

(86) PCT No.: PCT/EP2012/070237
§ 371 (c)(1),
(2) Date: Apr. 10, 2014

(87) PCT Pub. No.: WO2013/053877
PCT Pub. Date: Apr. 18, 2013

(65) Prior Publication Data
US 2014/0283969 A1    Sep. 25, 2014

(30) Foreign Application Priority Data
Oct. 13, 2011  (FR) .................................. 11 59241

(51) Int. Cl.
B60C 9/18    (2006.01)
B60C 9/22    (2006.01)
(Continued)

(52) U.S. Cl.
CPC .................. *B60C 9/28* (2013.01); *B60C 1/00* (2013.01); *B60C 9/18* (2013.01); *B60C 9/2006* (2013.04);
(Continued)

(58) Field of Classification Search
CPC ......... B60C 9/18; B60C 9/1835; B60C 9/185; B60C 9/22; B60C 9/28
See application file for complete search history.

(56) References Cited

U.S. PATENT DOCUMENTS 5,166,267 A * 11/1992 Cohn ........................ C08J 3/005
525/173
5,738,740 A *  4/1998 Cluzel ................... B60C 9/1821
152/454
(Continued)

FOREIGN PATENT DOCUMENTS

EP    0722977 A1    7/1996
EP    0849099 A2    6/1998
(Continued)

OTHER PUBLICATIONS

PCT/EP2012/070237, filed Oct. 12, 2012, International Search Report (ISR), Form PCT/ISA/210, dated Jan. 30, 2013 (including English translation), 7 pgs.

*Primary Examiner* — Justin Fischer
(74) *Attorney, Agent, or Firm* — Dickinson Wright PLLC

(57) ABSTRACT

A tire having a crown reinforcement formed of at least two working crown layers having unequal axial widths, a layer C of rubber mixture being positioned between at least the ends of the said at least two working crown layers, and the
(Continued)

crown reinforcement having at least one layer of circumferential reinforcing elements positioned radially between two working crown layers. The distance d between the end of the axially narrowest working layer and the working layer separated from the axially narrowest working layer by the layer C of rubber mixture is such that $1.1\emptyset < d < 2.2\emptyset$, ø being the diameter of the reinforcing elements of the said at least one layer of circumferential reinforcing elements, and, in a meridian plane, the thickness of the layer C of rubber mixture is substantially uniform.

15 Claims, 2 Drawing Sheets

(51) Int. Cl.
  *B60C 9/28* (2006.01)
  *B60C 9/20* (2006.01)
  *B60C 1/00* (2006.01)

(52) U.S. Cl.
  CPC ...... *B60C 9/185* (2013.01); *B60C 2009/1842* (2013.04); *B60C 2009/1864* (2013.04); *B60C 2009/2067* (2013.04); *B60C 2200/06* (2013.04); *Y10T 152/10801* (2015.01)

(56) References Cited

U.S. PATENT DOCUMENTS

| | | | |
|---|---|---|---|
| 5,871,597 | A | 2/1999 | Vasseur |
| 6,401,778 | B1* | 6/2002 | Cluzel ............... B60C 9/18 152/526 |
| 6,470,939 | B1 | 10/2002 | Cluzel |
| 7,575,031 | B2* | 8/2009 | Manno ............... B60C 9/2006 152/531 |
| 8,800,624 | B2* | 8/2014 | Nakata ............... B60C 9/18 152/526 |
| 2006/0169380 | A1 | 8/2006 | Radulescu et al. |
| 2006/0169382 | A1* | 8/2006 | Sandstrom ............... B60C 1/00 152/537 |
| 2011/0017376 | A1 | 1/2011 | Pottier et al. |

FOREIGN PATENT DOCUMENTS

| | | | |
|---|---|---|---|
| FR | 2778370 A1 | | 11/1999 |
| JP | 2009-292425 | * | 12/2009 |
| WO | 2005016668 A1 | | 2/2005 |
| WO | 2009083212 A1 | | 7/2009 |
| WO | WO 2011/036893 | * | 3/2011 |

* cited by examiner

TIRE COMPRISING A LAYER OF CIRCUMFERENTIAL REINFORCING ELEMENTS

This application claims benefit of the filing date of PCT/EP2012/070237, filed Oct. 12, 2012, which claims the benefit of FR1159241, filed Oct. 13, 2011, the entire contents of each of which are incorporated herein by reference for all purposes.

BACKGROUND

1. Field

Disclosed herein is a tire having a radial carcass reinforcement and more particularly to a tire intended to equip vehicles carrying heavy loads and running at sustained speed, such as, for example, lorries, tractors, trailers or buses.

2. Description of Related Art

Generally, in the tires of heavy-duty type, the carcass reinforcement is anchored on either side in the region of the bead and is surmounted radially by a crown reinforcement composed of at least two superimposed layers formed of threads or cords which are parallel in each layer and crossed from one layer to the next, forming angles of between 10° and 45° with the circumferential direction. The said working layers, forming the working reinforcement, can also be covered with at least one "protective" layer formed of reinforcing elements which are advantageously metallic and extensible, referred to as elastic. It can also comprise a layer of metal threads or cords having a low extensibility forming, with the circumferential direction, an angle of between 45° and 90°, this "triangulation" ply being radially located between the carcass reinforcement and the first "working" crown ply, which are formed of parallel threads or cords exhibiting angles at most equal to 45° in absolute value. The triangulation ply forms, with at least the said working ply, a triangulated reinforcement which exhibits, under the various stresses to which it is subjected, few deformations, the triangulation ply having the essential role of absorbing the transverse compressive loads to which all the reinforcing elements in the region of the crown of the tire are subjected.

Cords are said to be inextensible when the said cords exhibit, under a tensile force equal to 10% of the breaking force, a relative elongation at most equal to 0.2%.

Cords are said to be elastic when the said cords exhibit, under a tensile force equal to the breaking load, a relative elongation at least equal to 3% with a maximum tangent modulus of less than 150 GPa.

Circumferential reinforcing elements are reinforcing elements which form, with the circumferential direction, angles within the range +2.5°, −2.5° in the vicinity of 0°.

The circumferential direction of the tire, or longitudinal direction, is the direction corresponding to the periphery of the tire and defined by the direction in which the tire runs.

The transverse or axial direction of the tire is parallel to the axis of rotation of the tire.

The radial direction is a direction which intersects the axis of rotation of the tire and is perpendicular thereto.

The axis of rotation of the tire is the axis around which it revolves in normal use.

A radial or meridian plane is a plane which contains the axis of rotation of the tire.

The circumferential median plane, or equatorial plane, is a plane perpendicular to the axis of rotation of the tire and which divides the tire into two halves.

The term "modulus of elasticity" of a rubber mixture is understood to mean a secant modulus of extension at 10% deformation and at ambient temperature.

As regards the rubber compositions, the measurements of modulus are carried out in tension according to Standard AFNOR-NFT-46002 of September 1988: the nominal secant modulus (or apparent stress, in MPa) at 10% elongation is measured in second elongation (i.e., after an accommodation cycle) (normal conditions of temperature and hygrometry according to Standard AFNOR-NFT-40101 of December 1979).

Some current tires, referred to as "road" tires, are intended to run at high speed and over increasingly long journeys, as a result of the improvement in the road network and of the growth of the motorway network throughout the world. The combined conditions under which such a tire is called upon to run without any doubt makes possible an increase in the number of miles travelled, the wear on the tire being reduced; on the other hand, the endurance of the tire and in particular of the crown reinforcement is detrimentally affected.

This is because there exist stresses at the crown reinforcement and more particularly shear stresses between the crown layers, combined with a not insignificant rise in the operating temperature at the ends of the axially shortest crown layer, the consequence of which is the appearance and the propagation of cracks in the rubber at the said ends.

In order to improve the endurance of the crown reinforcement of the type of tire studied, solutions relating to the structure and quality of the layers and/or profiled elements of rubber mixtures which are positioned between and/or around the ends of plies and more particularly the ends of the axially shortest ply have already been introduced.

It is known in particular to introduce a layer of rubber mixture between the ends of the working layers in order to create a decoupling between the said ends in order to limit the shear stresses. Such decoupling layers must, however, exhibit a very good cohesion. Such layers of rubber mixtures are, for example, described in Patent Application WO 2004/076204.

Patent FR 1 389 428, in order to improve the resistance to deterioration of the rubber mixtures located in the vicinity of the crown reinforcement edges, recommends the use, in combination with a tread of low hysteresis, of a rubber profiled element covering at least the sides and the marginal edges of the crown reinforcement and consisting of a low-hysteresis rubber mixture.

Patent FR 2 222 232, in order to prevent separations between crown reinforcement plies, teaches coating the ends of the reinforcement in a rubber mat, the Shore A hardness of which is different from that of the tread surmounting the said reinforcement and greater than the Shore A hardness of the rubber mixture profiled element positioned between the edges of crown reinforcement plies and carcass reinforcement.

The tires thus produced make it possible effectively to improve the performance, in particular in terms of endurance.

Furthermore, it is known, in order to produce tires having a very broad tread or else in order to confer, on tires of a given dimension, higher load capabilities, to introduce a layer of circumferential reinforcing elements. Patent Application WO 99/24269 describes, for example, the presence of such a layer of circumferential reinforcing elements.

The layer of circumferential reinforcing elements is normally composed of at least one metal cord wound in order to form a turn, the angle at which it is laid with respect to the circumferential direction being less than 2.5°.

SUMMARY

An aim of embodiments of the invention is to provide tires, the properties, in particular of endurance and wear, of which are retained, whatever the use, and the manufacture of which is simplified, indeed even the manufacturing costs of which are reduced.

This aim is achieved according to embodiments of the invention by a tire having a radial carcass reinforcement comprising a crown reinforcement formed of at least two working crown layers of reinforcing elements crossed from one layer to the other while forming, with the circumferential direction, angles of between 10° and 45°, the said at least two working crown layers having unequal axial widths, a layer C of rubber mixture being positioned between at least the ends of the said at least two working crown layers, the crown reinforcement being topped radially by a tread, the said tread being joined to two beads via two sidewalls, the crown reinforcement comprising at least one layer of circumferential reinforcing elements positioned radially between two working crown layers, the distance d between the end of the axially narrowest working layer and the working layer separated from the axially narrowest working layer by the layer C of rubber mixture being such that $1.1\emptyset < d < 2.2\emptyset$, $\emptyset$ being the diameter of the reinforcing elements of the said at least one layer of circumferential reinforcing elements, and, in a meridian plane, the thickness of the layer C of rubber mixture being substantially uniform over the axial width between the axially interior end of the layer C and the end of the axially narrowest working layer.

According to the embodiments of the invention, the distance d is measured in a meridian plane from cord to cord, that is to say between the cord of a first working layer and the cord of a second working layer, along a direction substantially perpendicular to the surfaces of the layer C. In other words, this distance d encompasses the thickness of the first layer C and the respective thicknesses of the calendering rubber mixtures, radially external to the cords of the radially inner working layer and radially internal to the cords of the radially outer working layer.

According to the embodiments of the invention, the thickness of the layer C of rubber mixture is measured between the two surfaces of the said layer C along the orthogonal projection from one point of one surface to the other surface.

According to the embodiments of the invention, the thickness of the layer C of rubber mixture is essentially uniform means that it does not vary by more than 0.3 mm. These variations in thickness are due only to the phenomena of creep during the manufacture and curing of the tire. The layer C in semi-finished form, that is to say as elements ready to be used in the preparation of a tire, thus advantageously exhibits a uniform thickness.

The various measurements of thickness are carried out on a transverse cross section of a tire, the tire thus being in a non-inflated state.

The layer C of rubber mixture makes it possible to obtain a decoupling of the said working crown layers in order to distribute the shear stresses over a greater thickness. These shear stresses appear in particular as a result of circumferential tensions during passage through the contact area.

According to the embodiments of the invention, coupled layers are layers, the respective reinforcing elements of which are separated radially by at most 1.5 mm, the said rubber thickness being measured radially between the respectively upper and lower generatrices of the said reinforcing elements.

The designs of more conventional tires, which do not comprise layers of circumferential reinforcing elements, provide layers of rubber mixture positioned between the ends of the working crown layers with greater thicknesses, in particular at the end of the narrowest working layer, and with a non-homogeneous thickness profile when the latter is viewed along a meridian cross section of the tire in order to allow such a thickness and in order to prevent excessive disruption to the environment of the end of the narrowest working layer. The presence of this layer of rubber mixture makes it possible in particular to limit the shear stresses between the ends of the working crown layers, the said working crown layers having no circumferential stiffness at their ends. The distance between the end of the axially narrowest working layer and the working layer separated from the axially narrowest working layer by the layer of rubber mixture, measured in accordance with the definition of d above, is usually greater than 3.3 mm. This corresponds to a thickness of the layer of rubber mixture of at least 2.5 mm, whereas, generally, its thickness tends, at each of its ends, towards a value of less than 0.5 mm.

The inventors have been able to demonstrate that the presence of at least one layer of circumferential reinforcing elements radially between the two working crown layers makes it possible to retain a satisfactory performance, in particular in terms of endurance but also in terms of wear, with a layer C of rubber mixture having a substantially uniform thickness over the axial width between the axially inner end of the layer C and the end of the axially narrowest working layer and such that the distance d is between $1.1\emptyset$ and $2.2\emptyset$. This is because it appears that the presence of the layer of circumferential reinforcing elements contributes sufficiently to the absorption of at least a portion of the circumferential tension, in particular during passage through the contact area, to reduce the shear stresses between the ends of the working crown layers.

Furthermore, the layer C of rubber mixture is advantageously provided in the semi-finished state in the form of a layer of uniform thickness which is simple to manufacture and in addition which can be simply stored. This is because the layers normally used as described above, which in cross section exhibit a form with variations in thickness, are, first, more difficult to produce and, secondly, more difficult to store. This is because the variations in thickness create storage problems, these semi-finished products generally being stored in the form wound onto a spool.

The manufacture and the storage of the layer of rubber mixture in accordance with the invention in the semi-finished form thus being so simplified, this can result in reduced costs for the manufacture of the tire, it nevertheless being possible for the latter to comprise a layer of circumferential reinforcing elements, in addition, in comparison with a normal tire.

According to an advantageous alternative form of the invention, the tensile modulus of elasticity at 10% elongation of the layer C of rubber mixture is less than 8 MPa and the maximum tan($\delta$) value, denoted tan($\delta$)$_{max}$, of the layer C is less than 0.100.

The loss factor tan($\delta$) is a dynamic property of the layer of rubber mixture. It is measured on a viscosity analyzer (Metravib VA4000) according to Standard ASTM D 5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, at a temperature of 100° C., is recorded. A strain amplitude sweep is carried out from 0.1% to 50% (outward cycle) and then from 50% to 1% (return cycle). For the return cycle, the maximum value of tan(δ) observed, denoted tan(δ)$_{max}$, is indicated.

The rolling resistance is the resistance which appears when the tire rolls. It is represented by the hysteresis losses related to the deformation of the tire during a revolution. The frequency values related to the revolution of the tire correspond to tan(δ) values measured between 30 and 100° C. The tan(δ) value at 100° C. thus corresponds to an indicator of the rolling resistance of the tire when rolling.

It is also possible to estimate the rolling resistance by the measurement of the losses in energy by rebound of the samples having energy applied at temperatures of 60° C. and expressed as a percentage.

Advantageously, according to the embodiments of the invention, the loss at 60° C., denoted L60, of the layer of rubber mixture C is less than 20%.

According to this alternative form of the invention, the performance in terms of rolling resistance is improved and makes it possible to contribute to a reduced consumption of fuel by vehicles equipped with such tires.

The use of such mixtures, the moduli of elasticity of which are less than or equal to 8 MPa and the tan(δ)$_{max}$ value of which is less than 0.100, will make it possible to improve the properties of the tire as regards rolling resistance, while retaining satisfactory endurance properties.

A preferred embodiment according to this alternative embodiment of the invention, the layer C of rubber mixture is an elastomeric mixture based on natural rubber or on synthetic polyisoprene predominantly comprising cis-1,4 enchainments and optionally on at least one other diene elastomer, the natural rubber or the synthetic polyisoprene, in the case of a blend, being present at a predominant content with respect to the content of the other diene elastomer(s) used, and on a reinforcing filler consisting:

a) either of carbon black with a BET specific surface of greater than 60 m$^2$/g,
    i. employed at a content of between 20 and 40 phr when the structural index of the black (COAN) is greater than 85,
    ii. employed at a content of between 20 and 60 phr when the structural index of the black (COAN) is less than 85,
  b) or of carbon black with a BET specific surface of less than 60 m$^2$/g, whatever its structural index, employed at a content of between 20 and 80 phr and preferably between 30 and 50 phr,
  c) or of a white filler of silica and/or alumina type comprising SiOH and/or AlOH surface functional groups, selected from the group consisting of precipitated or fumed silicas, aluminas and aluminosilicates, or alternatively carbon blacks modified during or after the synthesis having a BET specific surface of between 30 and 260 m$^2$/g, employed at a content of between 20 and 80 phr and preferably between 30 and 50 phr,
  d) or of a blend of carbon black described in (a) and/or of carbon black described in (b) and/or a white filler described in (c), in which the overall content of filler is between 20 and 80 phr and preferably between 40 and 60 phr.

The BET specific surface measurement is carried out according to the Brunauer, Emmett and Teller method described in The Journal of the American Chemical Society, vol. 60, page 309, February 1938, corresponding to Standard NFT 45007 of November 1987.

The structural index of the black, COAN (Compressed Oil Absorption Number), is measured according to Standard ASTM D3493.

In the case of use of clear filler or white filler, it is necessary to use a coupling and/or covering agent chosen from the agents known to a person skilled in the art. Mention may be made, as examples of preferred coupling agents, of alkoxysilane sulphides of the bis(3-trialkoxysilylpropyl) polysulphide type and among these in particular of bis(3-triethoxysilylpropyl) tetrasulphide, sold by Degussa under the name Si69 for the pure liquid product and the name X50S for the solid product (50/50 by weight blend with N330 black). Mention may be made, as examples of covering agents, of a fatty alcohol, an alkylalkoxysilane, such as a hexadecyltrimethoxysilane or hexadecyltriethoxysilane respectively sold by Degussa under the names Si116 and Si216, diphenylguanidine, a polyethylene glycol or a silicone oil, optionally modified by means of OH or alkoxy functional groups. The covering and/or coupling agent is used in a ratio by weight, with respect to the filler, ≥ than 1/100 and ≤ than 20/100, and preferably of between 2/100 and 15/100, when the clear filler represents all of the reinforcing filler, and of between 1/100 and 20/100, when the reinforcing filler consists of a blend of carbon black and clear filler.

Mention may be made, as other examples of reinforcing fillers having the morphology and the SiOH and/or AlOH surface functional groups of the materials of silica and/or alumina type described above and which can be used according to the invention as partial or complete replacement for these, of carbon blacks modified either during the synthesis, by addition, to the feed oil of the furnace, of a silicon and/or aluminium compound, or after the synthesis, by adding an acid to an aqueous suspension of carbon black in a sodium silicate and/or aluminate solution, so as to at least partially cover the surface of the carbon black with SiOH and/or AlOH functional groups. Mention may be made, as nonlimiting examples of carbon-based fillers of this type with SiOH and/or AlOH functional groups at the surface, of the fillers of CSDP type described in Conference No. 24 of the ACS Meeting, Rubber Division, Anaheim, Calif., 6-9 May 1997, and also those of Patent Application EP-A-0 799 854.

When a clear filler is used as sole reinforcing filler, the hysteresis and cohesive properties are obtained by using a precipitated or fumed silica, or else a precipitated alumina or alternatively an aluminosilicate having a BET specific surface of between 30 and 260 m$^2$/g. Mention may be made, as nonlimiting examples of filler of this type, of the silicas KS404 from Akzo, Ultrasil VN2 or VN3 and BV3370GR from Degussa, Zeopol 8745 from Huber, Zeosil 175 MP or Zeosil 1165 MP from Rhodia, HI-SIL 2000 from PPG, and the like.

Mention may be made, among the diene elastomers which can be used as a blend with natural rubber or a synthetic polyisoprene predominantly comprising cis-1,4 enchainments, of a polybutadiene (BR) preferably predominantly comprising cis-1,4 enchainments, a solution or emulsion styrene/butadiene copolymer (SBR), a butadiene/isoprene copolymer (BIR) or alternatively a styrene/butadiene/isoprene terpolymer (SBIR). These elastomers can be elastomers modified during polymerization or after polymerization by means of branching agents, such as a divinylbenzene, or star-branching agents, such as carbonates, halotins or halosilicons, or alternatively by means of functionalization agents resulting in a grafting, to the chain or at the chain end, of oxygen-comprising carbonyl or carboxyl functional groups or else of an amine functional group, such as, for example, by the action of dimethylaminobenzophenone or diethylaminobenzophenone. In the case of blends of natural rubber or synthetic polyisoprene predominantly comprising cis-1,4 enchainments with one or more of the diene elastomers mentioned above, the natural rubber or the synthetic polyisoprene is preferably used at a predominant content and more preferably at a content of greater than 70 phr.

According to this preferred embodiment of the invention, a lower modulus of elasticity is generally accompanied by a lower viscous modulus G", this change proving to be favourable to a reduction in the rolling resistance of the tire.

The designs of more conventional tires provide layers of rubber mixture positioned between the ends of the working crown layers with tensile moduli of elasticity at 10% elongation of greater than 8.5 MPa, in particular in order to make it possible to limit the shear stresses between the ends of the working crown layers, the said working crown layers having no circumferential stiffness at their ends. Such moduli, which generally are even greater than 9 MPa, make it possible to prevent cracking from starting and propagating in the rubber mixtures at the ends of the said working crown layers and more particularly at the end of the narrowest working layer.

The inventors have been able to demonstrate that the presence of at least one layer of circumferential reinforcing elements makes it possible to retain a satisfactory performance, in particular in terms of endurance but also in terms of wear, with a tensile modulus of elasticity at 10% elongation of the layer C of less than 8 MPa.

The inventors have also been able to demonstrate that the cohesion of the layer C, when it exhibits a tensile modulus of elasticity at 10% elongation of less than 8 MPa, remains satisfactory.

According to the embodiments of the invention, a cohesive rubber mixture is a rubber mixture which is in particular robust towards cracking. The cohesion of a mixture is thus evaluated by a fatigue cracking test carried out on a "PS" (pure shear) test specimen. It consists in determining, after notching the test specimen, the crack propagation rate "PR" (nm/cycle) as a function of the energy restitution level "E" (J/m$^2$). The experimental domain covered by the measurement is within the range −20° C. and +150° C. in temperature, with an air or nitrogen atmosphere. The stress on the test specimen is an applied dynamic displacement with an amplitude of between 0.1 mm and 10 mm in the form of a pulse-type stress (tangent "haversine" signal) with a rest period equal to the duration of the pulse; the frequency of the signal is of the order of 10 Hz on average.

The measurement comprises 3 parts:
- An accommodation of the "PS" test specimen, of 1000 cycles at 27% deformation.
- An energy characterization in order to determine the law "E"=f (deformation). The energy restitution level "E" is equal to W0*h0, with W0=energy supplied to the material per cycle and per unit of volume and h0=initial height of the test specimen. The "force/displacement" data acquired is made use of to thus give the relationship between "E" and the amplitude of the stress.
- The cracking measurement, after notching the "PS" test specimen. The data collected result in the determination of the crack propagation rate "PR" as a function of the applied stress level "E".

The inventors have in particular demonstrated that the presence of at least one layer of circumferential reinforcing elements contributes to a reduced change in the cohesion of the layer C. This is because the designs of more conventional tires comprising in particular layers of rubber mixture positioned between the ends of the working crown layers with tensile moduli of elasticity at 10% elongation of greater than 8.5 MPa result in a change in the cohesion of the said layers of rubber mixture positioned between the ends of the working crown layers, the cohesion tending to become weaker. The inventors find that the presence of at least one layer of circumferential reinforcing elements which limits the shear stresses between the ends of the working crown layers and in addition limits the increases in temperature results in a slight change in the cohesion of the layer C. The inventors thus consider that the cohesion of the layer C, which is lower than that which exists in the designs of more conventional tires, is satisfactory in the design of the tire according to invention.

According to an embodiment of the invention, the layer of rubber mixture can be produced by stacking several layers in order to obtain the desired thickness.

According to an advantageous embodiment of the invention, the axially widest working crown layer is radially interior to the other working crown layers.

Preferably again, the axial width D of the layer of rubber mixture C comprised between the axially innermost end of the said layer of rubber mixture C and the end of the axially narrowest working crown layer is such that:

$$10 \cdot \varnothing_2 \leq D \leq 25 \cdot \varnothing_2$$

with ø2 the diameter of the reinforcing elements of the axially narrowest working crown layer. Such a relationship defines a region of engagement between the layer of rubber mixture C and the axially narrowest working crown layer. Such an engagement, below a value equal to three times the diameter of the reinforcing elements of the axially narrowest working layer, may not be sufficient to obtain a decoupling of the working crown layers in order in particular to obtain an alleviation of the stresses at the end of the axially narrowest working crown layer. A value for this engagement greater than twenty times the diameter of the reinforcing elements of the axially narrowest working layer can result in an excessively great decrease in the cornering stiffness of the crown reinforcement of the tire.

According to an embodiment of the invention, at least one layer of rubber mixture B bordering the end of a working crown layer, the tensile modulus of elasticity at 10% elongation of the said at least one layer of rubber mixture B is less than 8 MPa and the maximum tan(δ) value, denoted tan(δ)$_{max}$, for the said layer of rubber mixture B is less than 0.100.

According to the embodiments of the invention, the term "to border" should be understood as meaning that the layer of rubber mixture B is axially and/or radially adjacent to the axially outer end of the said working crown layer.

Advantageously again, according to this embodiment of the invention, the layer of rubber mixture B is, in a similar way to the first layer C of rubber mixture, an elastomeric mixture based on natural rubber or on synthetic polyisoprene predominantly comprising cis-1,4 enchainments and optionally on at least one other diene elastomer, the natural rubber or the synthetic polyisoprene, in the case of a blend, being present at a predominant content with respect to the content of the other diene elastomer(s) used, and on a reinforcing filler consisting:

a) either of carbon black with a BET specific surface of greater than 60 m²/g,
   i. employed at a content of between 20 and 40 phr when the structural index of the black (COAN) is greater than 85,
   ii. employed at a content of between 20 and 60 phr when the structural index of the black (COAN) is less than 85,
b) or of carbon black with a BET specific surface of less than 60 m²/g, whatever its structural index, employed at a content of between 20 and 80 phr and preferably between 30 and 50 phr,
c) or of a white filler of silica and/or alumina type comprising SiOH and/or AlOH surface functional groups, selected from the group consisting of precipitated or fumed silicas, aluminas and aluminosilicates, or alternatively carbon blacks modified during or after the synthesis having a BET specific surface of between 30 and 260 m²/g, employed at a content of between 20 and 80 phr and preferably between 30 and 50 phr,
d) or of a blend of carbon black described in (a) and/or of carbon black described in (b) and/or a white filler described in (c), in which the overall content of filler is between 20 and 80 phr and preferably between 40 and 60 phr.

In accordance with this embodiment of the invention, in contrast to the more conventional designs of tires, at least one layer bordering the end of a working crown layer and advantageously all of the layers bordering the ends of the working crown layers exhibit a modulus of elasticity of less than 8 MPa are thus less rigid than the layers of rubber mixtures normally used at these locations in the design of tires.

According to an alternative embodiment of the invention, the tensile modulus of elasticity at 10% elongation of at least one calendering layer of at least one working crown layer is less than 8.5 MPa and the maximum tan(δ) value, denoted $\tan(\delta)_{max}$, of the said at least one calendering layer of at least one working crown layer is less than 0.100.

Usually, the tensile moduli of elasticity at 10% elongation of the calendering layers of the working crown layers are greater than 10 MPa. Such moduli of elasticity are required in order to make it possible to limit the compressing of the reinforcing elements of the working crown layers, in particular when the vehicle is following a tortuous route, during manoeuvres in car parks or else when crossing roundabouts. This is because the shearing actions along the axial direction which act on the tread in the region of the contact surface with the ground result in the compressing of the reinforcing elements of a working crown layer.

The inventors have also been able to demonstrate that the layer of circumferential reinforcing elements allows lower moduli of elasticity without harming the properties of endurance of the tire as a result of the compressing of the reinforcing elements of the working crown layers as described above.

As in the case of the layer of rubber mixture C, the use of at least one calendering layer of at least one working crown layer, the modulus of elasticity of which is less than or equal to 8.5 MPa and the $\tan(\delta)_{max}$ value of which is less than 0.100, will make it possible to improve the properties of the tire as regards rolling resistance while retaining satisfactory endurance properties.

The inventors have also demonstrated that the combination of a layer of circumferential reinforcing elements and of tensile moduli of elasticity at 10% elongation of the calendering layers of the working crown layers of less than 8.5 MPa makes it possible to retain a satisfactory ply-steer effect.

The ply-steer effect corresponds to the appearance of a transverse thrust at zero cornering as a result of the structure of the tire and in particular of the presence of working crown layers of reinforcing elements forming an angle with the circumferential direction of between 10 and 45°, which are the cause of the said thrust during their deformations as a result of the passage through the contact area formed by the crushing of the tire on the ground when the tire is rolling.

The inventors have thus demonstrated that the ply-steer effect, which is modified as a result of the presence of a layer of circumferential reinforcing elements, will experience an alleviation in its variation as a result of the choice of calendering mixtures of the working layers with reduced moduli of elasticity. This is because the transverse thrust increases as a result of the presence of a layer of circumferential reinforcing elements, with respect to one and the same tire without the said layer of circumferential reinforcing elements, and this increase is alleviated by a choice of calendering mixtures of the working layers with moduli of elasticity which are reduced with respect to those normally used.

According to a preferred embodiment of the invention, the said at least one calendering layer of at least one working crown layer is an elastomeric mixture based on natural rubber or on synthetic polyisoprene predominantly comprising cis-1,4 enchainments and optionally on at least one other diene elastomer, the natural rubber or the synthetic polyisoprene, in the case of a blend, being present at a predominant content with respect to the content of the other diene elastomer(s) used, and on a reinforcing filler consisting:
   a) either of carbon black with a BET specific surface of greater than 60 m²/g,
      i. employed at a content of between 20 and 40 phr when the structural index of the black (COAN) is greater than 85,
      ii. employed at a content of between 20 and 60 phr when the structural index of the black (COAN) is less than 85,
   b) or of carbon black with a BET specific surface of less than 60 m²/g, whatever its structural index, employed at a content of between 20 and 80 phr and preferably between 30 and 50 phr,
   c) or of a white filler of silica and/or alumina type comprising SiOH and/or AlOH surface functional groups, selected from the group consisting of precipitated or fumed silicas, aluminas and aluminosilicates, or alternatively carbon blacks modified during or after the synthesis having a BET specific surface of between 30 and 260 m²/g, employed at a content of between 20 and 80 phr and preferably between 30 and 50 phr,
   d) or of a blend of carbon black described in (a) and/or of carbon black described in (b) and/or a white filler described in (c), in which the overall content of filler is between 20 and 80 phr and preferably between 40 and 60 phr.

In the case of use of clear filler or white filler, it is necessary to use a coupling and/or covering agent chosen from the agents known to a person skilled in the art. Mention may be made, as examples of preferred coupling agents, of alkoxysilane sulphides of the bis(3-trialkoxysilylpropyl) polysulphide type and among these in particular of bis(3-triethoxysilylpropyl) tetrasulphide, sold by Degussa under the name Si69 for the pure liquid product and the name X50S for the solid product (50/50 by weight blend with N330 black). Mention may be made, as examples of covering agents, of a fatty alcohol, an alkylalkoxysilane, such as a hexadecyltrimethoxysilane or hexadecyltriethoxysilane respectively sold by Degussa under the names Si116 and Si216, diphenylguanidine, a polyethylene glycol or a silicone oil, optionally modified by means of OH or alkoxy functional groups. The covering and/or coupling agent is used in a ratio by weight, with respect to the filler, ≥ than 1/100 and ≤ than 20/100, and preferably of between 2/100 and 15/100, when the clear filler represents all of the reinforcing filler, and of between 1/100 and 20/100, when the reinforcing filler consists of a blend of carbon black and clear filler.

Mention may be made, as other examples of reinforcing fillers having the morphology and the SiOH and/or AlOH surface functional groups of the materials of silica and/or alumina type described above and which can be used according to the invention as partial or complete replacement for these, of carbon blacks modified either during the synthesis, by addition, to the feed oil of the furnace, of a silicon and/or aluminium compound, or after the synthesis, by adding an acid to an aqueous suspension of carbon black in a sodium silicate and/or aluminate solution, so as to at least partially cover the surface of the carbon black with SiOH and/or AlOH functional groups. Mention may be made, as nonlimiting examples of carbon-based fillers of this type with SiOH and/or AlOH functional groups at the surface, of the fillers of CSDP type described in Conference No. 24 of the ACS Meeting, Rubber Division, Anaheim, Calif., 6-9 May 1997, and also those of Patent Application EP-A-0 799 854.

When a clear filler is used as sole reinforcing filler, the hysteresis and cohesive properties are obtained by using a precipitated or fumed silica, or else a precipitated alumina or alternatively an aluminosilicate having a BET specific surface of between 30 and 260 $m^2/g$. Mention may be made, as nonlimiting examples of filler of this type, of the silicas KS404 from Akzo, Ultrasil VN2 or VN3 and BV3370GR from Degussa, Zeopol 8745 from Huber, Zeosil 175 MP or Zeosil 1165 MP from Rhodia, HI-SIL 2000 from PPG, and the like.

Mention may be made, among the diene elastomers which can be used as a blend with natural rubber or a synthetic polyisoprene predominantly comprising cis-1,4 enchainments, of a polybutadiene (BR) preferably predominantly comprising cis-1,4 enchainments, a solution or emulsion styrene/butadiene copolymer (SBR), a butadiene/isoprene copolymer (BIR) or alternatively a styrene/butadiene/isoprene terpolymer (SBIR). These elastomers can be elastomers modified during polymerization or after polymerization by means of branching agents, such as a divinylbenzene, or star-branching agents, such as carbonates, halotins or halosilicons, or alternatively by means of functionalization agents resulting in a grafting, to the chain or at the chain end, of oxygen-comprising carbonyl or carboxyl functional groups or else of an amine functional group, such as, for example, by the action of dimethylaminobenzophenone or diethylaminobenzophenone. In the case of blends of natural rubber or synthetic polyisoprene predominantly comprising cis-1,4 enchainments with one or more of the diene elastomers mentioned above, the natural rubber or the synthetic polyisoprene is preferably used at a predominant content and more preferably at a content of greater than 70 phr.

Advantageously again according to the invention, the difference between the tensile modulus of elasticity at 10% elongation of the first layer C and the tensile modulus of elasticity at 10% elongation of the said at least one calendering layer of at least one working crown layer is less than 2 MPa.

According to a first embodiment, the modulus of elasticity of the calendering of at least the narrowest working crown layer is greater than that of the said layer C of rubber mixture in order for the stack of the said layers to exhibit a modulus of elasticity gradient favourable to the combating of the initiation of cracking at the end of the narrowest working crown layer.

According to a second embodiment, the moduli of elasticity of the calendering of the working crown layers and of that of the said layer C of rubber mixture are identical and advantageously again the rubber mixtures are the same in order to simplify the industrial conditions for the manufacture of the tire.

According to an advantageous implementation of the invention, the said reinforcing elements of at least one working crown layer are saturated layered cords, at least one inner liner being sheathed with a layer consisting of a polymeric composition, such as a non-crosslinkable, crosslinkable or crosslinked rubber composition, preferably based on at least one diene elastomer.

"Layered" or "multilayer" cords are cords consisting of a central core and of one or more virtually concentric layers of yarns or threads arranged around this central core.

According to the embodiments of the invention, a saturated layer of a layered cord is a layer consisting of threads in which there does not exist sufficient space to add thereto at least one additional thread.

The inventors have been able to demonstrate that the presence of the cords as just described as reinforcing elements of working crown layers makes it possible to contribute to a better performance in terms of endurance.

This is because it is apparent, as explained above, that the rubber mixtures of the calenderings of the working layers make it possible to reduce the rolling resistance of the tire. This is reflected by a fall in the temperatures of these rubber mixtures when the tire is used, which can result in reduced protection of the reinforcing elements with regard to oxidation phenomena in some cases of use of the tire. This is because the properties of the rubber mixtures relating to the blocking of the oxygen decline with temperature, and the presence of oxygen can result in a gradual deterioration in the mechanical properties of the cords, for the most severe rolling conditions, and can detrimentally affect the lifetime of these cords.

The presence of the rubber sheath within the cords described above will compensate for this possible risk of oxidation of the reinforcing elements, the sheath contributing to the blocking of the oxygen.

The expression "composition based on at least one diene elastomer" is understood to mean, in a known way, that the composition predominantly comprises (i.e., according to a fraction by weight of greater than 50%) this or these diene elastomers.

It should be noted that the sheath according to invention extends continuously around the layer which it covers (that is to say that this sheath is continuous in the "orthoradial" direction of the cord, which is perpendicular to its radius), so as to form a continuous sleeve having a transverse cross section which is advantageously virtually circular.

It should also be noted that the rubber composition of this sheath can be crosslinkable or crosslinked, that is to say that it comprises, by definition, a suitable crosslinking system for making possible the crosslinking of the composition during the curing thereof (i.e., the curing thereof and not the melting thereof); thus, this rubber composition can be described as infusible, owing to the fact that it cannot be melted by heating at any temperature whatever.

A "diene" elastomer or rubber is understood, in a known way, to mean an elastomer resulting at least in part (i.e., a homopolymer or a copolymer) from diene monomers (monomers bearing two conjugated or non-conjugated carbon-carbon double bonds).

Preferably, the system for crosslinking the rubber sheath is a "vulcanization" system, that is to say a system based on sulphur (or on a sulphur-donating agent) and on a primary vulcanization accelerator. Additional to this base vulcanization system may be various known secondary vulcanization accelerators or vulcanization activators.

The rubber composition of the sheath according to the invention can comprise, in addition to the said crosslinking system, all the normal ingredients which can be used in rubber compositions for tires, such as reinforcing fillers based on carbon black and/or on a reinforcing inorganic filler, such as silica, anti-ageing agents, for example antioxidants, extending oils, plasticizers or agents which promote the processing of compositions in the raw state, methylene acceptors and donors, resins, bismaleimides, known adhesion-promoting systems of the "RFS" (resorcinol/formaldehyde/silica) type or metal salts, in particular cobalt salts.

Preferably, the composition of this sheath is chosen to be identical to the composition used for the calendering layer of the working crown layer which the cords are intended to reinforce. Thus, there is no problem of possible incompatibility between the respective materials of the sheath and of the rubber matrix.

According to an alternative form of the invention, the said cords of at least one working crown layer are layered cords of [L+M] construction, comprising a first layer C1 having L threads of diameter $d_1$ wound together in a helix according to a pitch $p_1$ with L ranging from 1 to 4, surrounded by at least one intermediate layer C2 having M threads of diameter $d_2$ wound together in a helix according to a pitch $p_2$ with M ranging from 3 to 12, a sheath composed of a non-crosslinkable, crosslinkable or crosslinked rubber composition based on at least one diene elastomer covering, in the construction, the said first layer C1.

Preferably, the diameter of the threads of the first layer of the inner layer (C1) is between 0.10 and 0.5 mm and the diameter of the threads of the outer layer (C2) is between 0.10 and 0.5 mm.

More preferably, the winding helix pitch of the said threads of the outer layer (C2) is between 8 and 25 mm.

Within the meaning of the disclosure, the helix pitch represents the length, measured parallel to the axis of the cord, at the end of which a thread having this pitch makes one complete turn around the axis of the cord; thus, if the axis is sectioned by two planes perpendicular to the said axis and separated by a length equal to the pitch of a thread of a constituent layer of the cord, the axis of this thread has, in both these planes, the same position on the two circles corresponding to the layer of the thread under consideration.

Advantageously, the cord exhibits one and more preferably still all of the following characteristics, which is confirmed:

the layer C2 is a saturated layer, that is to say that there does not exist sufficient space in this layer to add thereto at least one (N+1)th thread of diameter $d_2$, N then representing the maximum number of threads which can be wound as a layer around the layer C1;

the rubber sheath in addition covers the inner layer C1 and/or separates the paired adjacent threads of the outer layer C2;

the rubber sheath covers virtually the radially inner half-circumference of each thread of the layer C2, so that it separates the adjacent paired threads of this layer C2.

Preferably, the rubber sheath exhibits a mean thickness ranging from 0.010 mm to 0.040 mm.

Generally, the said cords according to the invention can be produced with metal threads of any type, in particular made of steel, for example threads made of carbon steel and/or threads made of stainless steel. Use is preferably made of carbon steel but it is, of course, possible to use other steels or other alloys.

When a carbon steel is used, its carbon content (% by weight of steel) is preferably between 0.1% and 1.2%, more preferably between 0.4% and 1.0%; these contents represent a good compromise between the mechanical properties required for the tire and the feasibility of the thread. It should be noted that a carbon content of between 0.5% and 0.6% renders such steels finally less expensive as they are easier to draw. Another advantageous embodiment of the invention can also consist, depending on the applications targeted, in using steels having a low carbon content, for example of between 0.2% and 0.5%, due in particular to a lower cost and to a greater ease of drawing.

The said cords according to the invention can be obtained according to various techniques known to a person skilled in the art, for example in two stages, first of all by sheathing the core or layers C1 via an extrusion head, which stage is followed, in a second step, by a final operation in which the remaining threads M (layer C2) are cabled or twisted around the layer C1 thus sheathed. The problem of bonding in the raw state posed by the rubber sheath during the optional intermediate winding and unwinding operations can be solved in a way known to a person skilled in the art, for example by the use of an interposed plastic film.

Such cords of at least one working crown layer are, for example, chosen from the cords described in Patent Applications WO 2006/013077 and WO 2009/083212.

According to an advantageous alternative embodiment of the invention, the layer of circumferential reinforcing elements exhibits an axial width of greater than 0.5×S.

S is the axial maximum width of the tire, when the latter is fitted to its service rim and inflated to its recommended pressure.

The axial widths of the layers of reinforcing elements are measured on a transverse cross section of a tire, the tire thus being in a non-inflated state.

According to a preferred implementation of the invention, the difference between the axial width of the axially widest working crown layer and the axial width of the axially narrowest working crown layer being between 10 and 30 mm.

Advantageously again according to the invention, the axial widths of the working crown layers radially adjacent to the layer of circumferential reinforcing elements are greater than the axial width of the said layer of circumferential reinforcing elements and, preferably, the said working crown layers adjacent to the layer of circumferential reinforcing elements are on either side of the equatorial plane and, in the immediate axial extension of the layer of circumferential reinforcing elements, coupled over an axial width, in order to be subsequently decoupled by the said layer C of rubber mixture at least over the remainder of the width common to the said two working layers.

The presence of such couplings between the working crown layers adjacent to the layer of circumferential reinforcing elements makes it possible to decrease the tensile stresses acting on the axially outermost circumferential elements located closest to the coupling.

According to an advantageous embodiment of the invention, the reinforcing elements of at least one layer of circumferential reinforcing elements are metal reinforcing elements exhibiting a secant modulus at 0.7% elongation of between 10 and 120 GPa and a maximum tangent modulus of less than 150 GPa.

According to a preferred implementation, the secant modulus of the reinforcing elements at 0.7% elongation is less than 100 GPa and greater than 20 GPa, preferably between 30 and 90 GPa and more preferably less than 80 GPa.

Preferably again, the maximum tangent modulus of the reinforcing elements is less than 130 GPa and more preferably less than 120 GPa.

The moduli expressed above are measured on a curve of tensile stress as a function of the elongation determined with a preload of 20 MPa corrected for the cross section of metal of the reinforcing element, the tensile stress corresponding to a measured tension corrected for the cross section of metal of the reinforcing element.

The moduli of the same reinforcing elements can be measured on a curve of tensile stress as a function of the elongation determined with a preload of 10 MPa corrected for the overall cross section of the reinforcing element, the tensile stress corresponding to a measured tension corrected for the overall cross section of the reinforcing element. The overall cross section of the reinforcing element is the cross section of a composite element consisting of metal and rubber, the latter having in particular penetrated the reinforcing element during the phase of curing the tire.

According to this formulation relating to the overall cross section of the reinforcing element, the reinforcing elements of the axially outer parts and the central part of at least one layer of circumferential reinforcing elements are metal reinforcing elements exhibiting a secant modulus at 0.7% elongation of between 5 and 60 GPa and a maximum tangent modulus of less than 75 GPa.

According to a preferred implementation, the secant modulus of the reinforcing elements at 0.7% elongation is less than 50 GPa and greater than 10 GPa, preferably between 15 and 45 GPa and more preferably less than 40 GPa.

Preferably again, the maximum tangent modulus of the reinforcing elements is less than 65 GPa and more preferably less than 60 GPa.

According to a preferred embodiment, the reinforcing elements of at least one layer of circumferential reinforcing elements are metal reinforcing elements exhibiting a curve of tensile stress as a function of the relative elongation having low slopes for the low elongations and a substantially constant and high slope for the greater elongations. Such reinforcing elements of the additional ply are normally known as "bimodulus" elements.

According to a preferred implementation of the invention, the substantially constant and high slope appears from a relative elongation of between 0.1% and 0.5%.

The various characteristics of the reinforcing elements set out above are measured on reinforcing elements withdrawn from tires.

Reinforcing elements more particularly suited to the production of at least one layer of circumferential reinforcing elements according to the invention are, for example, assemblies of formula 21.23, the construction of which is 3×(0.26+6×0.23) 4.4/6.6 SS; this stranded cord consists of 21 elementary threads of formula 3×(1+6), with three strands twisted together and each consisting of seven threads, one thread forming a central core of diameter equal to 26/100 mm and six wound threads of diameter equal to 23/100 mm. Such a cord exhibits a secant modulus at 0.7% equal to 45 GPa and a maximum tangent modulus equal to 98 GPa, these being measured on a curve of tensile stress as a function of the elongation determined with a preload of 20 MPa corrected for the cross section of metal of the reinforcing element, the tensile stress corresponding to a measured tension corrected for the cross section of metal of the reinforcing element. On a curve of tensile stress as a function of the elongation determined with a preload of 10 MPa corrected for the overall cross section of the reinforcing element, the tensile stress corresponding to a measured tension corrected for the overall cross section of the reinforcing element, this cord of formula 21.23 exhibits a secant modulus at 0.7% equal to 23 GPa and a maximum tangent modulus equal to 49 GPa.

Likewise, another example of reinforcing elements is an assembly of formula 21.28, the construction of which is 3×(0.32+6×0.28) 6.2/9.3 SS. This cord exhibits a secant modulus at 0.7% equal to 56 GPa and a maximum tangent modulus equal to 102 GPa, these being measured on a curve of tensile stress as a function of the elongation determined with a preload of 20 MPa corrected for the cross section of metal of the reinforcing element, the tensile stress corresponding to a measured tension corrected for the cross section of metal of the reinforcing element. On a curve of tensile stress as a function of the elongation determined with a preload of 10 MPa corrected for the overall cross section of the reinforcing element, the tensile stress corresponding to a measured tension corrected for the overall cross section of the reinforcing element, this cord of formula 21.28 exhibits a secant modulus at 0.7% equal to 27 GPa and a maximum tangent modulus equal to 49 GPa.

The use of such reinforcing elements in at least one layer of circumferential reinforcing elements makes it possible in particular to retain satisfactory stiffnesses of the layer, including after the shaping and curing stages in conventional manufacturing processes.

According to a second embodiment of the invention, the circumferential reinforcing elements can be formed of inextensible metal elements cut so as to form sections having a length far smaller than the circumference of the shortest layer but preferably greater than 0.1 times the said circumference, the cuts between sections being axially offset with respect to one another. Preferably again, the tensile modulus of elasticity per unit of width of the additional layer is less than the tensile modulus of elasticity, measured under the same conditions, of the most extensible working crown layer. Such an embodiment makes it possible to confer, in a simple way, on the layer of circumferential reinforcing elements, a modulus which can be easily adjusted (by the choice of the intervals between sections of one and the same row) but which in all cases is lower than the modulus of the layer consisting of the same metal elements but with the latter being continuous, the modulus of the additional layer being measured on a vulcanized layer of cut elements which has been withdrawn from the tire.

According to a third embodiment of the invention, the circumferential reinforcing elements are undulating metal elements, the ratio a/λ of the undulation amplitude to the wavelength being at most equal to 0.09. Preferably, the tensile modulus of elasticity per unit of width of the additional layer is less than the tensile modulus of elasticity, measured under the same conditions, of the most extensible working crown layer.

The metal elements are preferably steel cords.

According to a preferred embodiment of the invention, the reinforcing elements of the working crown layers are inextensible metal cords.

The invention advantageously also provides, in order to reduce the tensile stresses acting on the axially outermost circumferential elements, for the angle formed by the reinforcing elements of the working crown layers with the circumferential direction to be less than 30° and preferably less than 25°.

A preferred embodiment of the invention also provides for the crown reinforcement to be supplemented radially on the outside by at least one additional layer, known as protective layer, of "elastic" reinforcing elements, which are oriented, with respect to the circumferential direction, with an angle of between 10° and 45° and in the same direction as the angle formed by the inextensible elements of the working layer radially adjacent to it.

The protective layer can have an axial width smaller than the axial width of the narrowest working layer. The said protective layer can also have an axial width greater than the axial width of the narrowest working layer, such that it overlaps the edges of the narrowest working layer and, when it is the layer radially above which is narrowest, such that it is coupled, in the axial extension of the additional reinforcement, with the widest working crown layer over an axial width in order thereafter, axially on the outside, to be decoupled from the said widest working layer by profiled elements having a thickness at least equal to 2 mm. The protective layer formed of elastic reinforcing elements can, in the abovementioned case, on the one hand be optionally decoupled from the edges of the said narrowest working layer by profiled elements having a thickness substantially less than the thickness of the profiled elements separating the edges of the two working layers and, on the other hand, have an axial width less than or greater than the axial width of the widest crown layer.

According to any one of the embodiments of the invention mentioned above, the crown reinforcement can also be supplemented, radially on the inside between the carcass reinforcement and the radially inner working layer closest to the said carcass reinforcement, by a triangulation layer of inextensible metal reinforcing elements made of steel forming, with the circumferential direction, an angle greater than 60° and in the same direction as that of the angle formed by the reinforcing elements of the layer radially closest to the carcass reinforcement.

The tire according to the embodiments of the invention as just described in its alternative embodiments thus exhibits an improved rolling resistance in comparison with conventional tires while retaining a comparable performance in terms of endurance and wear.

In addition, the lower moduli of elasticity of the various rubber mixtures make it possible to render the crown of the tire flexible and to thus limit the risks of attacks on the crown and of corrosion of the reinforcing elements of the crown reinforcement layers when, for example, stones are retained in the pattern bottom areas.

BRIEF DESCRIPTION OF THE DRAWINGS

Other advantageous details and characteristics of embodiments of the invention will emerge below from the description of the implementational examples of the invention, with reference to FIGS. 1 and 2, which represent.

DETAILED DESCRIPTION OF SPECIFIC EMBODIMENTS

The figures are not represented to scale in order to make them easier to understand. The figures represent only a half-view of a tire, which extends symmetrically with respect to the axis XX', which represents the circumferential median plane, or equatorial plane, of a tire.

Figure 1:
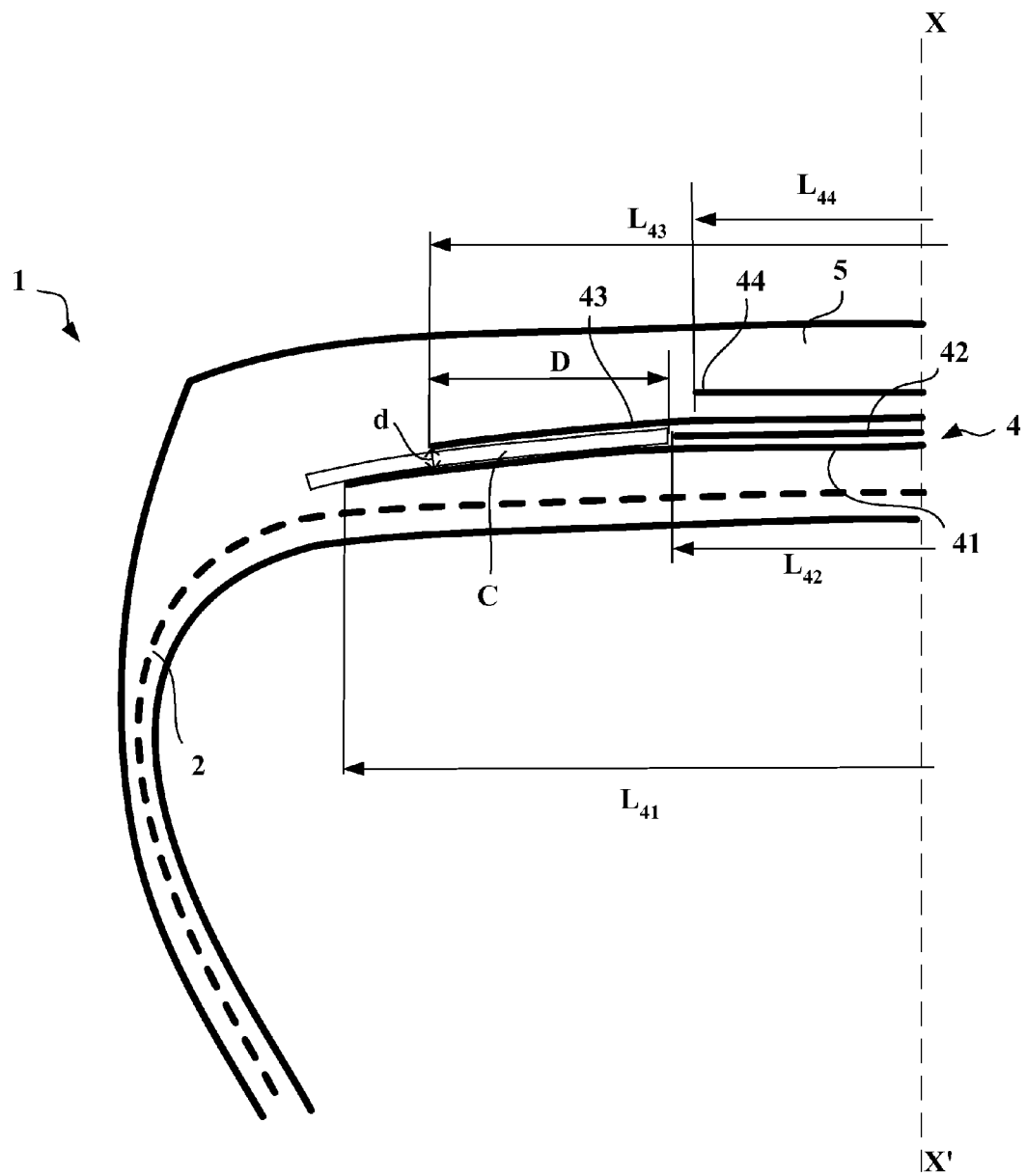
FIG. 1, a meridional view of a diagram of a tire according to an embodiment of the invention, FIG. 2, a meridional view of a diagram of a tire according to a second embodiment of the invention.

In FIG. 1, the tire 1, of dimension 315/70 R 22.5, has an aspect ratio H/S equal to 0.70, H being the height of the tire 1 on its mounting rim and S being its maximum axial width. The said tire 1 comprises a radial carcass reinforcement 2 anchored in two beads, not represented in the figure. The carcass reinforcement is formed of a single layer of metal cords. This carcass reinforcement 2 is hooped by a crown reinforcement 4 formed radially, from the inside to the outside:

- of a first working layer 41 formed of non-hooped inextensible metal cords 9.28 which are continuous over the entire width of the ply and which are oriented with an angle equal to 24°,
- of a layer of circumferential reinforcing elements 42 which is formed of metal cords made of steel 21×23, of "bimodulus" type,
- of a second working layer 43 formed of non-hooped inextensible metal cords 9.28 which are continuous over the entire width of the ply, which are oriented with an angle equal to 24° and which are crossed with the metal cords of the layer 41,
- of a protective layer 44 formed of elastic metal cords 6.35.

The crown reinforcement is itself topped by a tread 5.

The maximum axial width S of the tire is equal to 317 mm.

The axial width $L_{41}$ of the first working layer 41 is equal to 252 mm.

The axial width $L_{43}$ of the second working layer 43 is equal to 232 mm. The difference between the widths $L_{41}$ and $L_{43}$ is equal to 15 mm.

With regard to the axial width $L_{42}$ of the layer of circumferential reinforcing elements 42, it is equal to 194 mm.

The final crown ply 44, referred to as protective ply, has a width $L_{44}$ equal to 124 mm.

In accordance with the embodiments of the invention, a layer of rubber mixture C will decouple the ends of the working crown layers 41 and 43.

The region of engagement of the layer C between the two working crown layers 41 and 43 is defined by its thickness and more specifically the radial distance d between the end of the layer 43 and the layer 41 and by the axial width D of the layer C between the axially inner end of the said layer C and the radially outer end of the working crown layer 43. The radial distance d is equal to 2 mm, which corresponds to a thickness of the layer C equal to 1.2 mm. In accordance with the invention, the thickness of the layer C is substantially identical in a meridional view over the axial width between the axially inner end of the layer C and the end of the axially narrowest working layer.

The diameter of the circumferential reinforcing elements of the layer 42 is equal to 1.35 mm. The distance d is thus equal to 1.48 times the diameter 0 of these elements.

The axial distance D is equal to 20 mm, i.e. approximately 19 times the diameter $\phi_2$ of the reinforcing elements of the working ply 42, the diameter $\phi_2$ being equal to 1.07 mm.

Figure 2:
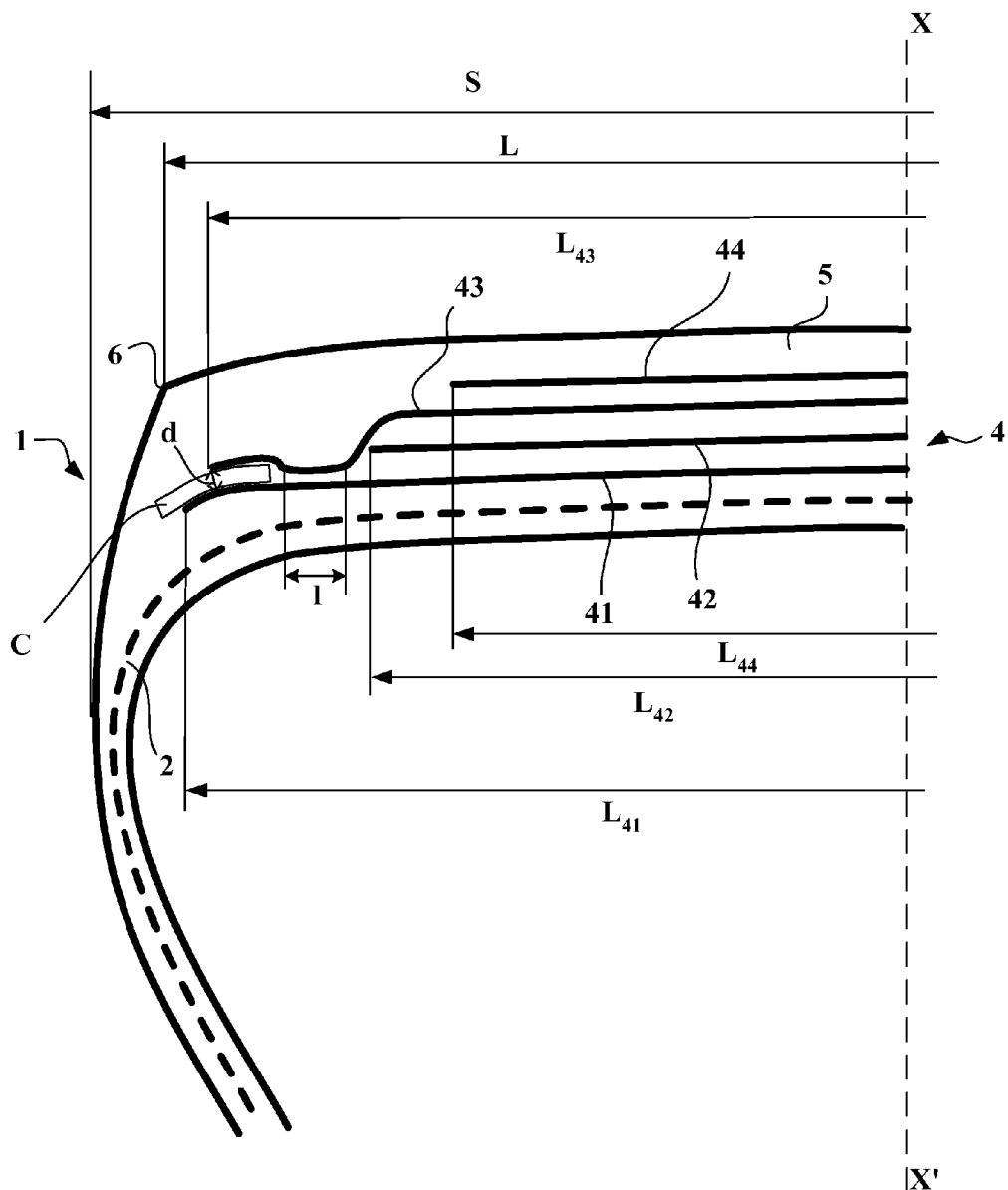

In FIG. 2, the tire 1 differs from that represented in FIG. 1 in that the two working layers 41 and 43 are, on each side of the equatorial plane and axially in the extension of the layer of circumferential reinforcing elements 42, coupled over an axial width 1: the cords of the first working layer 41 and the cords of the second working layer 43, over the axial coupling width 1 of the two layers, are separated radially from one another by a rubber layer, the thickness of which is minimal and corresponds to twice the thickness of the rubber calendering layer of the non-hooped metal cords 9.28 of which each working layer 41, 43, is formed, i.e. 0.8 mm.

In addition, tests are carried out with tires according to the invention while varying the characteristics of the mixtures of the layer C, in particular their tensile moduli of elasticity at 10% elongation and the $\tan(\delta)_{max}$ values, in accordance with the invention.

Other tests are also carried out with tires according to the invention while also varying the characteristics of the calendering layers mixtures of the working layers 41 and 43, in particular their tensile moduli of elasticity at 10% elongation and the $\tan(\delta)_{max}$ values, in accordance with the invention.

The various mixtures used are listed below, the tensile modulus of elasticity at 10% elongation and the $\tan(\delta)_{max}$ and P60 values being expressed for each.

|  | Mixture R1 | Mixture R2 | Mixture 1 | Mixture 2 | Mixture 3 | Mixture 4 | Mixture 5 |
| --- | --- | --- | --- | --- | --- | --- | --- |
| NR | 100 | 100 | 100 | 100 | 100 | 100 | 100 |
| Black N347 | 52 | 50 |  | 33 |  |  |  |
| Black N683 |  |  |  |  |  | 44 | 30 |
| Black N326 |  |  | 47 |  |  |  |  |
| Silica 165G |  |  |  |  | 46 |  |  |
| Antioxidant (6 PPD) | 1 | 1.8 | 1.5 | 1 | 2 | 1 | 1 |
| Stearic acid | 0.65 | 0.6 | 0.9 | 0.65 | 1 | 0.65 | 0.65 |
| Zinc oxide | 9.3 | 9.3 | 7.5 | 9.3 | 8 | 9.3 | 9.3 |
| Cobalt salt (CoAcac) | 1.12 |  | 1.12 | 1.12 | 1.1 | 1.12 | 1.12 |
| Cobalt salt (CoAbietate) |  | 4.5 |  |  |  |  |  |
| Silane-on-black |  |  |  |  | 8.3 |  |  |
| Sulphur | 6.1 | 5.6 | 4.5 | 6.1 | 4.8 | 6.1 | 6.1 |
| Accelerator DCBS | 0.93 | 0.8 | 0.8 | 0.93 |  | 0.93 | 0.93 |
| Accelerator TBBS |  |  |  |  | 1.01 |  |  |
| Coaccelerator DPG |  |  |  |  | 1.1 |  |  |
| Retarder CTP PVI | 0.25 |  | 0.15 | 0.25 | 0.2 | 0.25 | 0.25 |
| $M_{10}$ (MPa) | 10.4 | 8.5 | 5.99 | 5.56 | 7.25 | 6.16 | 4.4 |
| $\tan(\delta)_{max}$ | 0.130 | 0.141 | 0.099 | 0.074 | 0.063 | 0.056 | 0.030 |
| L60 (%) | 22.9 | 24.5 | 18.7 | 14.9 | 13.3 | 12.2 | 8.5 |

Over the remaining width common to the two working layers, the two working layers 41, 43 are separated by the layer of rubber mixture C, the thickness of the said layer C increasing on proceeding from the axial end of the coupling region to the end of the narrowest working layer 43. The layer C advantageously has a sufficient width to radially overlap the end of the widest working layer 41, which is, in this case, the working layer radially closest to the carcass reinforcement.

The preparation of tires according to the invention has demonstrated a simplifying of the manufacture, conditioning and storage of the layer C of rubber mixture as semi-finished product before preparing the tire. The preparation itself of the tire is also simplified, the positioning and the accuracy of positioning of the said layer C being simpler as a result of its homogeneous form concerning its cross section.

Despite the presence of an additional layer of circumferential reinforcing elements in the architecture of the tire, it appears that, for some dimensions of tires, the manufacturing costs may be reduced by virtue of these simplifications to manufacturing, management and processing of the layer C of rubber mixture.

Furthermore, tests have been carried out with different tires prepared according to the invention in accordance with the representation of FIG. 1 and compared with a first reference tire not comprising layers of circumferential reinforcing elements and comprising a layer C of rubber mixture not in accordance with that of the invention and exhibiting a distance d equal to 3.5 mm and a rounded profile of its cross section.

The values of the constituents are expressed in phr (parts by weight per hundred parts of elastomers).

As regards the reference tire, the layer C is composed of the mixture R2 and the calenderings of the working layers are composed of the mixture R1.

Different tires according to embodiments of the invention were tested.

A first series of tires S1 in accordance with embodiments of the invention was prepared with a first layer C composed of the mixture R2, the calenderings of the working layers being composed of the mixture R1.

A second series of tires S2 in accordance with embodiments of the invention was prepared with a first layer C composed of the mixtures 1 to 5, the calenderings of the working layers being composed of the mixture R1.

A third series of tires S3 in accordance with embodiments of the invention was prepared with a first layer C composed of the mixture R2, the calenderings of the working layers being composed of the mixtures 1 to 5.

A fourth series of tires S4 in accordance with embodiments of the invention was prepared with a first layer C composed of the mixtures 1 to 5, the calenderings of the working layers also being composed of the mixtures 1 to 5. Some tires of this series S2 were prepared with identical mixtures for the layer C and the calenderings of the working layers and others with different mixtures.

First endurance tests were carried out on a test machine which made each of the tires run in a straight line at a speed equal to the maximum speed index prescribed for the said tire under an initial load of 4000 kg which was gradually increased in order to reduce the duration of the test.

Other endurance tests were carried out on a test machine which cyclically applies a transverse load and a dynamic overload to the tires. The tests were carried out for the tires according to the invention with conditions identical to those applied to the reference tires.

The tests thus carried out showed that the distances travelled during each of these tests are at least as great for the tires according to the invention as the reference tires. It is thus apparent that the tires according to the invention exhibit a performance in terms of endurance which is at least as good as that of the reference tires. The series of tires S2 and S4 prepared in accordance with the invention exhibited in particular superior results.

Other running tests were carried out on non-bituminous surfaces consisting of stones particularly aggressive towards the treads of the tires.

The latter tests showed that, after identical distances travelled, the tires according to embodiments of the invention and more particularly those of the S3 and S4 series exhibit fewer and less significant detrimental changes than those of the reference tires.

These tests show in particular that, in addition to the design of the tires according to embodiments of the invention, which allows the form of the layer C of rubber mixture in accordance with the invention to be simplified, the combination of this form of the layer C with a decrease in the modulus of elasticity of the layer of rubber mixture C and of those of the calenderings of the working crown layers results in a satisfactory endurance performance when a layer of circumferential reinforcing elements is present.

Furthermore, rolling resistance measurements were carried out. These measurements related to a first reference tire T1 as described above, to a second reference tire T2 identical to the above and additionally comprising a layer of circumferential reinforcing elements identical to that of the tires according to the invention, to a tire of the S1 series, to a tire of the S2 series, the layer C of which is composed of the mixture 1, to a tire of the S3 series, the calendering layers of which are composed of the mixture 1, and to a tire of the S4 series, the layer C of which and the calendering layers of which are composed of the mixture 1.

The results of the measurements are presented in the following table; they are expressed in kg/t, a value of 100 being assigned to the tire T1.

| Tire T1 | Tire T2 | Tire S1 | Tire S2 | Tire S3 | Tire S4 |
|---|---|---|---|---|---|
| 100 | 101 | 100 | 98 | 97 | 95 |

The invention claimed is:

1. A tire comprising:
a radial carcass reinforcement comprising a crown reinforcement comprising;
at least two working crown layers of reinforcing elements crossed from one layer to the other while forming, with a circumferential direction, angles of between 10° and 45°, wherein the at least two working crown layers have unequal axial widths,
a layer C of rubber mixture being positioned between at least the ends of the at least two working crown layers,
at least one layer of circumferential reinforcing elements positioned radially between two working crown layers, wherein the distance d between the end of the axially narrowest working layer and the working layer separated from the axially narrowest working layer by the layer C of rubber mixture is such that $1.1\varnothing < d < 2.2\varnothing$, ø being the diameter of the reinforcing elements of the at least one layer of circumferential reinforcing elements, and wherein, in a meridian plane, the thickness of the layer C of rubber mixture does not vary by more than 0.3 mm over the axial width between the axially interior end of the layer C and the end of the axially narrowest working layer,
wherein the axial widths of the working crown layers radially adjacent to the layer of circumferential reinforcing elements are greater than the axial width of the layer of circumferential reinforcing elements, and
wherein the working crown layers adjacent to the layer of circumferential reinforcing elements on either side of an equatorial plane and, in an immediate axial extension of the layer of circumferential reinforcing elements, coupled over an axial width, in order to be subsequently decoupled by said layer C of rubber mixture of at least over the remainder of the width common to the two working layers,
a tread, the tread being joined to two beads via two sidewalls, and
wherein the tread radially tops the crown reinforcement.

2. The tire according to claim 1, wherein the tensile modulus of elasticity at 10% elongation of the layer C of rubber mixture is less than 8 MPa and in that the maximum tan(d) value, denoted $\tan(d)_{max}$, of the layer C of rubber mixture is less than 0.100.

3. The tire according to claim 2, wherein the layer C of rubber mixture is an elastomeric mixture based on natural rubber or on synthetic polyisoprene comprising predominantly cis-1,4 enchainments and optionally at least one other diene elastomer, the natural rubber or the synthetic polyisoprene, in the case of a blend, being present at a predominant content with respect to the content of other diene elastomer(s) used, and on a reinforcing filler consisting:
a) either of carbon black with a BET specific surface of greater than 60 m²/g,
i. employed at a content of between 20 and 40 phr when the structural index of the carbon black using Compressed Oil Absorption Number (COAN) is greater than 85,
ii. employed at a content of between 20 and 60 phr when the structural index of the carbon black (COAN) is less than 85,
b) or of carbon black with a BET specific surface of less than 60 m²/g, whatever its structural index, employed at a content of between 20 and 80 phr,
c) or of a white filler of silica and/or alumina type comprising SiOH and/or AlOH surface functional groups, selected from the group consisting of precipitated or fumed silicas, aluminas and aluminosilicates, or alternatively carbon blacks modified during or after the synthesis having a BET specific surface of between 30 and 260 m²/g, employed at a content of between 20 and 80 phr,
d) or of a blend of carbon black described in (a) and/or of carbon black described in (b) and/or a white filler described in (c), in which the overall content of filler is between 20 and 80 phr.

4. The tire according to claim 2, further comprising at least one layer of rubber mixture B bordering the end of a working crown layer, wherein the tensile modulus of elasticity at 10% elongation of the at least one layer of rubber mixture B is less than 8 MPa and wherein the maximum tan(d) value, denoted tan(d)$_{max}$, for the layer of rubber mixture B is less than 0.100.

5. The tire according to claim 2, wherein the at least two working crown layers are each formed of reinforcing elements inserted between two calendering layers of rubber mixture, wherein the tensile modulus of elasticity at 10% elongation of at least one calendering layer of at least one working crown layer is less than 8.5 MPa and wherein the maximum tan(d) value, denoted tan(d)$_{max}$, of the at least one calendering layer of at least one working crown layer is less than 0.100.

6. The tire according to claim 5, wherein the at least one calendering layer of at least one working crown layer is an elastomeric mixture based on natural rubber or on synthetic polyisoprene predominantly comprising cis-1,4 enchainments and optionally at least one other diene elastomer, wherein the natural rubber or the synthetic polyisoprene, in the case of a blend, is present at a predominant content with respect to the content of other diene elastomer(s) used, and on a reinforcing filler consisting:
  a) either of carbon black with a BET specific surface of greater than 60 m$^2$/g,
    i. employed at a content of between 20 and 40 phr when the structural index of the carbon black using Compressed Oil Absorption Number (COAN) is greater than 85,
    ii. employed at a content of between 20 and 60 phr when the structural index of the carbon black (COAN) is less than 85,
  b) or of carbon black with a BET specific surface of less than 60 m$^2$/g, whatever its structural index, employed at a content of between 20 and 80 phr,
  c) or of a white filler of silica and/or alumina type comprising SiOH and/or AlOH surface functional groups, selected from the group consisting of precipitated or fumed silicas, aluminas and aluminosilicates, or alternatively carbon blacks modified during or after the synthesis having a BET specific surface of between 30 and 260 m$^2$/g, employed at a content of between 20 and 80 phr,
  d) or of a blend of carbon black described in (a) and/or of carbon black described in (b) and/or a white filler described in (c), in which the overall content of filler is between 20 and 80 phr.

7. The tire according to claim 5, wherein the difference between the tensile modulus of elasticity at 10% elongation of the layer C of rubber mixture and the tensile modulus of elasticity at 10% elongation of the at least one calendering layer of at least one working crown layer is less than 2 MPa.

8. The tire according to claim 1, wherein the said reinforcing elements of at least one working crown layer are saturated layered cords, at least one inner liner being sheathed with a layer consisting of a polymeric composition, such as a non-crosslinkable, crosslinkable or crosslinked rubber composition.

9. The tire according to claim 1, wherein the difference between the axial width of the axially widest working crown layer and the axial width of the axially narrowest working crown layer is between 10 and 30 mm.

10. The tire according to claim 1, wherein the axially widest working crown layer is radially interior to the other working crown layers.

11. The tire according to claim 1, wherein the reinforcing elements of the at least one layer of circumferential reinforcing elements are metal reinforcing elements exhibiting a secant modulus at 0.7% elongation of between 10 and 120 GPa and a maximum tangent modulus of less than 150 GPa.

12. The tire according to claim 1, wherein the reinforcing elements of the working crown layers are inextensible.

13. The tire according to claim 1, wherein the angle formed by the reinforcing elements of the working crown layers with the circumferential direction is less than 30°.

14. The tire according to claim 1, wherein the crown reinforcement is supplemented radially on the outside by at least one additional ply, known as protective ply, of "elastic" reinforcing elements, which are oriented, with respect to the circumferential direction, with an angle of between 10° and 45° and in the same direction as the angle formed by the inextensible elements of the working ply radially adjacent to it.

15. A tire comprising:
  a radial carcass reinforcement comprising a crown reinforcement comprising;
    at least two working crown lavers of reinforcing elements crossed from one layer to the other while forming, with a circumferential direction, angles of between 10° and 45°, wherein the at least two working crown layers have unequal axial widths,
    a layer C of rubber mixture being positioned between at least the ends of the at least two working crown lavers,
    at least one layer of circumferential reinforcing elements positioned radially between two working crown layers, wherein the distance d between the end of the axially narrowest working layer and the working layer separated from the axially narrowest working layer by the layer C of rubber mixture is such that 1.1 ø<d<2.2 ø, ø being the diameter of the reinforcing elements of the at least one layer of circumferential reinforcing elements, and wherein, in a meridian plane, the thickness of the layer C of rubber mixture does not vary by more than 0.3 mm over the axial width between the axially interior end of the layer C and the end of the axially narrowest working layer, and
    a triangulation layer formed of metal reinforcing elements forming, with the circumferential direction, angles greater than 60°,
  a tread, the tread being joined to two beads via two sidewalls, and
  wherein the tread radially tops the crown reinforcement.

* * * * *